(12) United States Patent
Leslie et al.

(10) Patent No.: US 8,838,585 B2
(45) Date of Patent: Sep. 16, 2014

(54) PROJECT RESOURCE QUALIFICATION AND KEYWORD SCORING

(75) Inventors: Victoria Leslie, Roseville, CA (US); Jeff Colvard, Wilkinsburg, PA (US); Brian Cohen, Clayton, CA (US); Darryl Watson, Pleasanton, CA (US); Muljadi Sulistio, Pleasanton, CA (US); Tianyi Wang, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 159 days.

(21) Appl. No.: 13/458,858

(22) Filed: Apr. 27, 2012

(65) Prior Publication Data

US 2013/0290312 A1    Oct. 31, 2013

(51) Int. Cl.
*G06F 17/30*    (2006.01)
*G06G 7/00*    (2006.01)

(52) U.S. Cl.
USPC .............................. 707/723; 707/748; 705/321

(58) Field of Classification Search
None
See application file for complete search history.

(56) References Cited

U.S. PATENT DOCUMENTS

| | | | |
|---|---|---|---|
| 7,752,017 B1 | 7/2010 | Leary et al. | |
| 7,991,632 B1 | 8/2011 | Morris et al. | |
| 2003/0236692 A1 | 12/2003 | Hertel-Szabadi | |
| 2005/0004825 A1 | 1/2005 | Ehrler et al. | |
| 2005/0080657 A1* | 4/2005 | Crow et al. | 705/8 |
| 2006/0015388 A1 | 1/2006 | Flockhart et al. | |
| 2006/0095420 A1 | 5/2006 | Ikegami et al. | |
| 2006/0229896 A1* | 10/2006 | Rosen et al. | 705/1 |
| 2007/0244734 A1* | 10/2007 | McGovern et al. | 705/7 |
| 2008/0027747 A1* | 1/2008 | McGovern et al. | 705/1 |
| 2011/0093340 A1* | 4/2011 | Kramer et al. | 705/14.58 |
| 2011/0295759 A1* | 12/2011 | Selvakummar et al. | 705/321 |
| 2011/0302100 A1* | 12/2011 | Selvakummar | 705/321 |
| 2013/0018871 A1* | 1/2013 | Mehta et al. | 707/723 |

FOREIGN PATENT DOCUMENTS

| | | | |
|---|---|---|---|
| EP | 540442 A2 | 5/1993 | |
| GB | 2479647 A | 10/2011 | |
| JP | 2003044642 A | 2/2003 | |
| JP | 2005157630 A | 6/2005 | |

OTHER PUBLICATIONS

Author Unknown, "Resource Allocation from the Top & Bottom—You Need Both!" ManagePro, accessed Jan. 12, 2012 from http://www.managepro.com/resourceallocation.html, Copyright 1998-2011, Performance Solutions Technology, LLC; 7 pages.
NetSuite Open Air—obtained at www.openair.com; Apr. 3, 2012; 1 page.
Professional Services Automation Software for Projector PSA—obtained at www.projectorPSA.com; Apr. 3, 2012; 1 page.

* cited by examiner

*Primary Examiner* — Dung K Chau
(74) *Attorney, Agent, or Firm* — Trellis IP Law Group, PC

(57) ABSTRACT

A system and method for facilitating determining and displaying search results and accompanying scores in an enterprise computing environment. The example method includes receiving a resource request that includes one or more search criteria. The one or more search criteria includes a specification of one or more keywords and one or more resource qualifications. The method further includes determining, based on the search criteria, a qualification score for each resource indicated in a database of resources; using the qualification score to determine search results responsive to the resource request; and displaying each search result proximate to a qualification score. In a specific embodiment, the method further includes calculating the qualification score by combining components of the qualification score according to an algorithm. The components of the qualification score include a competency component and a keyword component.

18 Claims, 8 Drawing Sheets

110 ─┐

```
ORACLE                    Personalization  Help  Sign Out   John Smith
Home▽  Navigator▽  Recent Items▽  Favorites▽  Watchlist▽
Project Resources
```

Overview / Manage Proj. Res. Requests / Proj. Res. Req.: Tech Lead1

Manage Project Resource Request: Tech Lead 1        ⟵112    [Actions] [Save]

⊟ Resource Request Details

| | | | |
|---|---|---|---|
| *Projec Name*: | Tech Lead-1 | *Resource*: | TBD |
| *Status*: | Open | *Project Role*: | Tech Lead |
| *Req. Start Date*: | 10/17/11 | *Location*: | Chicago |
| *Req. Finish Date*: | 01/15/12 | *Calendar*: | US |

*Special Instructions*:
*Staffing Remarks*:

⊟ Tasks

- Manage Resource Requests

Show Less        ⟵ 114        116

View▽  Format▽  | ✚ ✎ ✖ | 🗗 | 🗗 | ☐Freeze  🗐Detach | ⏎Wrap

|  |  |  | Language Proficiency |||
|---|---|---|---|---|---|
| *Requested | Type | Proficiency | Reading | Speaking | Writing |
| Java Beans 4.0 ▽ | Competency | Expert ▽ | | | |
| Financial ▽ | Keyword | | | | |
| French ▽ | Language | | Expert | Intermediate | Novice |
| SQL 11.1 ▽ | Competency | Interm. ▽ | | | |
| XYZ ▽ | Keyword | | | | |

| ORACLE | | Personalization  Help  Sign Out  John Smith⬤ |
|---|---|---|
| Home▽ Navigator▽ | Recent Items▽ Favorites▽ Watchlist▽ | |

Project Resources

Overview | Manage Proj. Res. Req.'s | Proj. Res. Req. Tech Lead1 | Compare: Tech Lead1 ✖

Resource Detail:: Burgman, Ruth

☒ Resource Request Details

☒ Resource Information　　　　　　　　　　　　　　　　　　　　　　　　　　⟵ 172

| View▽ Format▽ \| 🔲 | | | |
|---|---|---|---|
| Col. Name | Jones, Fred | Burgman, Ruth | Artois, Camille |
| Job Title | Senior Consultant | Senior Consultant | Senior Consultant |
| Proj. Role | Tech Lead ✓ | Tech Lead ✓ | Tech Lead ✓ |
| Location | San Francisco, CA | Boston, MA | Sacramento, CA |
| Overall Match Score | ▨▨▨▨ 100%<br>0  50  100 | ▨▨▨▨ 95%<br>0  50  100 | ▨▨⬜ 75%<br>0  50  100 |

⎯ 64 ⎯

☒ Requested Qualifications　　　　　　　　　　　　　　　　　　　　　　　　⟵ 174

| View▽ Format▽ \| 🔲 | | | |
|---|---|---|---|
| Qualification | Jones, Fred | Burgman, Ruth | Artois, Camille |
| Java Beans 4.0 (Expert) | Expert ✓ | Expert ✓ | Intermediate ✓- |
| SQL 11.1 (Intermediate) | Expert ✓+ | Expert ✓+ | ⊘ |

⎯ 144 ⎯

☒ Requested Keywords　　　　　　　　　　　　　　　　　　　　　　　　　　⟵ 176

| View▽ Format▽ \| 🔲 | | | |
|---|---|---|---|
| Keyword | Jones, Fred | Burgman, Ruth | Artois, Camille |
| Financial | ① | ① | ⓪ |
| XYZ | ② | ② | ② |

⎯ 178 ⎯　　　　　　　　　　　　　　　　⟵ 152

Show More

FIG. 5

Keyword Details

| Keywords | Matching Qual. | Jones, Fred | | Burgman, Ruth | | Artois, Camille | |
|---|---|---|---|---|---|---|---|
| | | Match | Proficiency | Match | Proficiency | Match | Proficiency |
| Financial | French | | N/A | | N/A | | N/A |
| XYZ | SQL 11.1 | ✓+ | Expert | ✓+ | Expert | ⊘ | N/A |

FIG. 6

PROJECT RESOURCE QUALIFICATION AND KEYWORD SCORING

CROSS REFERENCES TO RELATED APPLICATIONS

This application is related to the following application, U.S. patent application Ser. No. 13/438,372, entitled CARD VIEW FOR PROJECT RESOURCE SEARCH RESULTS, filed on Apr. 3, 2012, which is hereby incorporated by reference, as if set forth in full in this specification.

BACKGROUND

The present application relates to software and more specifically to user interface designs and accompanying methods for facilitating providing informative search results and related insight.

Software for providing informative search results is employed in various demanding applications, including Enterprise Resource Planning (ERP) project management and resource management applications. Such applications often demand effective features for facilitating making informed selections from search results.

In an example enterprise environment, a given project may require certain resources, such as human resources (e.g. personnel) to meet certain needs. A resource manager may employ resource management software to ascertain available resources to meet those needs. In response to a resource query, also called a resource request, the resource management software may provide specialized search results based on search criteria included in the resource request. The search criteria may set forth certain requirements, e.g., pertaining to personnel availability, qualifications, proficiencies, and so on, in accordance with project needs.

The resource management software may employ the search criteria and a qualification scoring algorithm to score resources and thereby determine the specialized search results. A resource manager typically selects one or more resources from the displayed search results to assign to work on a particular project.

However, conventionally, qualification scores behind the search results are often not readily accessible, viewable, or understandable in view of the search results. Furthermore, conventional qualification scoring algorithms are often excessively complex. Consequently, resource managers often cannot not be certain that a particular resource shown among the search results is preferable to another resource or that the search results present proper matches for a particular resource request. Hence, conventional search results may be relatively unreliable, complex, and limited, thereby potentially inhibiting informed decision making and reducing resource manager productivity.

SUMMARY

An example method facilitates determining and displaying search results and accompanying scores in an enterprise computing environment. The example method includes receiving a resource request that includes one or more search criteria. The one or more search criteria include an indication of one or more keywords and one or more resource qualifications. The example method further includes determining, based on the search criteria, a qualification score for each resource indicated in a database of resources; using the qualification score to determine search results responsive to the resource request; and displaying each search result proximate to a qualification score.

In a specific embodiment, the method further includes calculating the qualification score by combining components of the qualification score according to an algorithm. The components of the qualification score include a competency component (also called a structured qualification score) and a keyword component.

The example algorithm further includes determining a number of instances of a keyword appearing in a resource profile, and then dividing the number of instances by a highest number of instances of the keyword found in resource profiles concurrently being searched, to yield the keyword component. The algorithm further includes averaging the competency component and the keyword component to yield the qualification score, also called an overall qualification score. In certain implementations, the algorithm may additionally include omitting (from search results) resources lacking one or more qualifications that are specified (via the resource request) as required qualifications.

In the specific embodiment, the example method further includes providing a user option to view instances of keyword matches occurring in a resource profile or other representation of a resource shown in the search results. The method further includes displaying one or more graphical representations or indicators illustrating a degree to which a resource matches a resource request or component thereof. Example graphical representations include selective combinations of one or more checkmarks, plus symbols, minus signs, null symbols, and so on. The example graphical representations may indicate resources having various combinations of requested qualifications and associated proficiency levels. For example, different graphical representations may illustrate when a resource has both a particular requested qualification and a requested proficiency value specified in the resource request; has a particular requested qualification but has a higher proficiency score than that requested in the resource request; has a particular requested qualification but has a lower proficiency score than that requested in the resource request; lacks a particular requested qualification that was requested in the resource request, and so on.

The example method may further include providing various additional user options; including a user option to display calculation details of a score for a particular resource appearing among the search results, and a user option to compare resources appearing in the search results.

Hence, certain embodiment discussed herein may facilitate efficiently displaying search results and conveying information about scores, e.g., qualification scores, used to determine the search results. The conveyed information, which need not be configured by a user, may include graphical representations of scores, score comparisons, indications of instances of keyword matches, and so on. Such conveyed information, including insight as to how a score is calculated, may help resource managers to efficiently and confidently make informed resource-allocation decisions.

A further understanding of the nature and the advantages of particular embodiments disclosed herein may be realized by reference of the remaining portions of the specification and the attached drawings.

BRIEF DESCRIPTION OF THE DRAWINGS

FIG. 3 is a second example user interface display screen adapted for enabling a user to edit the resource request of FIG. 2.

FIG. 5 is a third example user interface display screen illustrating results of a compare operation and providing a juxtaposition of qualifications and keywords associated with plural resources relevant to a particular resource request.

FIG. 6 is a fourth example user interface display screen, which is accessible via the third example user interface display screen of FIG. 5, and which illustrates details pertaining to key words found resource results profiles being compared.

DETAILED DESCRIPTION OF EMBODIMENTS

Although the description has been described with respect to particular embodiments thereof, these particular embodiments are merely illustrative, and not restrictive.

For example, while various embodiments herein are discussed with respect to user interface display screens suitable for desktop implementations and enterprise computing environments, embodiments are not limited thereto. Various embodiments disclosed herein may be adapted for use with virtually any computer based display, including smart phone displays, tablet displays, and so on.

Furthermore, while various user interface controls, such as buttons, tabs, sliders, and so on, are shown, other types of user interface controls may be employed in addition to or instead of such controls, without departing from the scope of the present teachings.

For the purposes of the present discussion, a user interface control may be any displayed element or component of a user interface display screen, which is adapted to enable a user to provide input. Examples of user interface controls include buttons, drop down menus, menu items, hyperlinks, and so on.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

Figure 1:
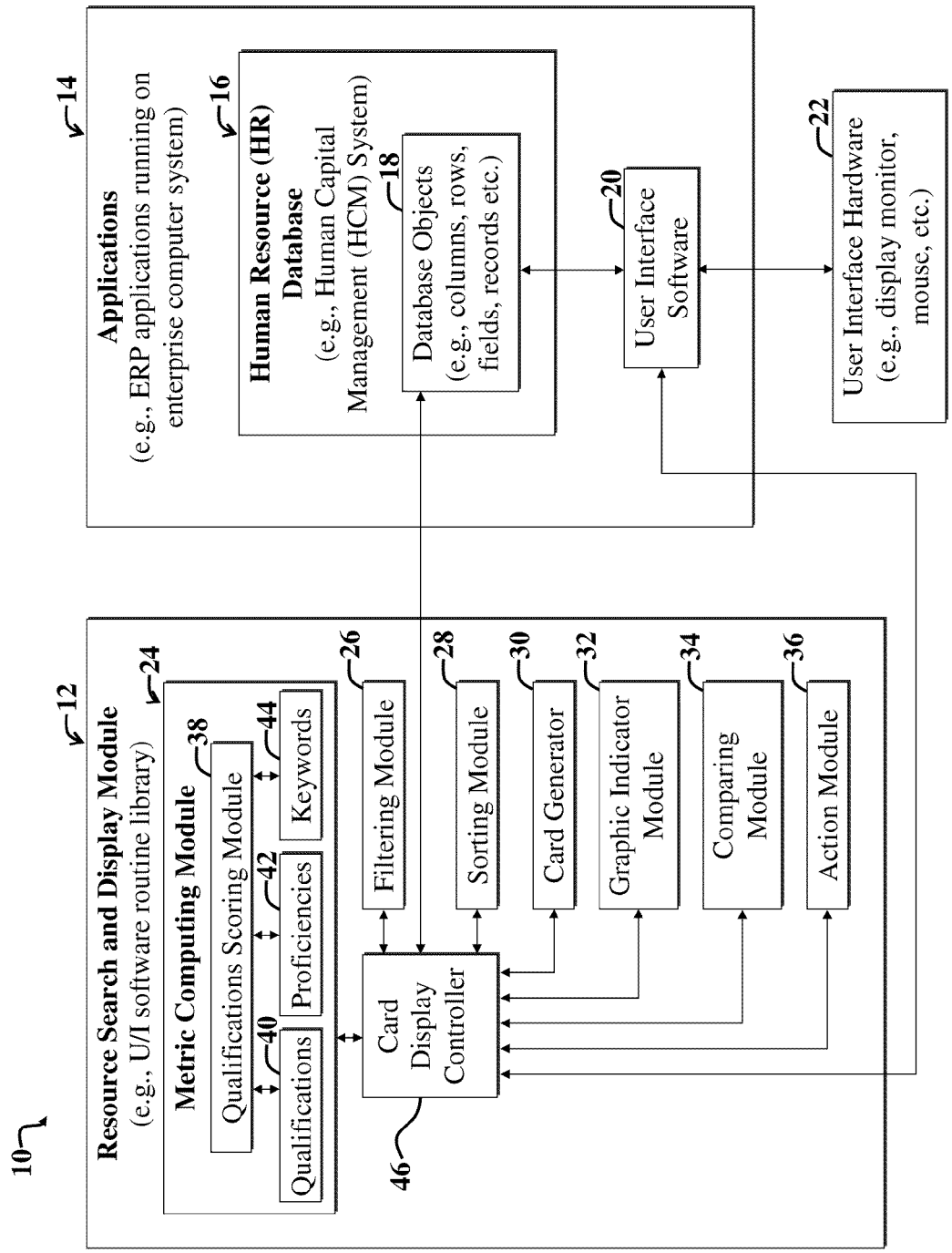
FIG. 1 is a diagram illustrating a first example embodiment of a system for facilitating conducting a resource query and displaying, organizing, and interacting with search results and accompanying scores in response thereto.

FIG. 1 is a diagram illustrating a first example embodiment of a system 10 for facilitating conducting a resource query and displaying, organizing, and interacting with search results in response thereto. The example system 10 includes a resource search and display module 12 in communication with one or more software applications, such as Enterprise Resource Planning (ERP) software applications 14 (also simply called ERP applications).

The system 10 is considered part of an enterprise computing environment. For the purposes of the present discussion, an enterprise computing environment may be any computing environment used for a business or organization. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

For the purposes of the present discussion, ERP software may be any set of computer code that is adapted to facilitate managing resources of an organization. Example resources include Human Resources (HR) (e.g., enterprise personnel), financial resources, assets, employees, and so on, of an enterprise. The terms "ERP software" and "ERP application" may be employed interchangeably herein. However, an ERP application may include one or more ERP software modules or components, such as user interface software modules or components.

Enterprise personnel may be any person or persons associated with an enterprise. An enterprise may be any organization of persons, such as a company, non-profit organization, university, government, and so on. Examples of enterprise personnel include employees, independent contractors, managers, investors, and so on.

Enterprise software applications, such as Customer Relationship Management (CRM), Business Intelligence (BI), Enterprise Resource Planning (ERP), and project management software, often include databases with various database objects, also called data objects or entities. A database object, also called a computing object herein, may be any collection of data, such as data pertaining to a particular financial account, asset, employee, contact, and so on. Examples of computing objects include, but are not limited to, records, tables, or other database entities corresponding to accounts receivables, products, employees, customers, business resources, and so on.

The example ERP applications 14 include a Human Resource (HR) database 16, which maintains various database objects 18. The database 16 communicates with user interface software 20, which communicates with user interface hardware 22. The user interface software 20 further communicates with the resource search and display module 12 via a card display controller 46 included in the resource search and display module 12.

The resource search and display module 12 further includes a metric computing module 24, a results filtering module 26, a results sorting module 28, a card generator 30, a graphic indicator module 32, a card comparing module 34, and an action module 36, all of which communicate with the card display controller 46. The card display controller 46 further communicates with the human resources database 16 and may facilitate conducting searches thereof.

For illustrative purposes, the metric computing module 24 is shown further including a qualification scoring module 38 in communication with a competencies module 40, a proficiencies module 42, and a keywords module 44. Note that the metric computing module 24 may include additional modules and functionality other than that shown. For example, the metric computing module 24 may further including computer code for computing availability scores or other metrics, as discussed more fully below.

In an example operative scenario, a resource manager employs the system 10 to conduct a search of human resources, such as enterprise personnel, whose characteristics, e.g., availability, qualifications, knowledge, experience, and so on, meet a particular set of criteria for a given project, task, or role. For the purposes of the present discussion, a human resource may be any person and accompanying knowledge and capabilities that may provide value to an organization, such as in the form of work or other effort.

The resource manager employs the user interface hardware 22 and software 20 to enter data (corresponding to search criteria), which characterizes a sought resource. The entered data represents a resource request, also called a resource query. For the purposes of the present discussion, a resource request may be any database query seeking search results that contain data pertaining to a resource of an organization, such as a human resource. The resource request may include, for example, a specification or description of a resource sought to meet one or more needs or requirements of a project or task. In the present example embodiment, enterprise personnel, such as a resource manager, may enter (via the user interface hardware 22 and software 20) a resource request that includes one or more search criteria specifying sought characteristics of a human resource.

Data pertaining to the resource request is sent from the user interface software 20 to the card display controller 46, which conducts a search of the HR database 16. Alternatively, the user interface software 20 conducts the search of the HR database 16 based on the resource request. In either case, a set of one or more results is returned to the card display controller 46. The card display controller 46 then organizes the search results in various cards, i.e., electronic cards, wherein each card corresponds to a database object representing a result.

For the purposes of the present discussion, a card, also called an electronic card, may be any collection of data and/or graphics presented in a region of a display screen. In the present example embodiment, the region is marked by a rectangular border, as discussed more fully below, but other shapes, such as circles, may be possible. Cards discussed herein may be tiled, cascaded, and so on. Similarly, cards may be characterized by different aspect ratios. For example, vertically or horizontally stretched cards may be horizontally or vertically arranged in rows or columns or may be placed in swim lanes, filmstrips, carousels, and so on, without departing from the scope of the present teachings.

The card display controller 46 may communicate with the metric computing module 24 to determine, for example, how to calculate and/or weight values, i.e., metrics (in view of the resource request) to be displayed via one or more graphics. For example, in the present embodiment, the qualification scoring module 38 includes computer code for calculating an overall qualification score based on competency values, proficiency scores, and keyword scores in accordance with an algorithm implemented via the computer code.

For the purposes of the present discussion, a keyword may be any word or phrase which may occur in a profile or other computing object associated with a resource (e.g., a resource's resume, biography, description, work summary, etc.), wherein the word or phrase is used in a search or query of a database containing profiles or other computing objects associated with one or more resources.

The competencies module 40 may store values associated with qualifications for a particular resource being analyzed. For example, a qualification value for a particular resource may be 0 if the resource does not exhibit the qualification, and 1 if the resource exhibits the qualification. For the purposes of the present discussion, the terms 'qualification' and 'competency' may be employed interchangeably herein and may refer to a resource's ability to perform one or more tasks or roles indicated by a resource request. For example, a resource that is considered qualified to program in Java Beans 4.0 and is qualified to work with PeopleSoft Financials 8.9 is said to have or exhibit a Java Beans 4.0 qualification or competency and PeopleSoft Financials 8.9 qualification or competency.

Different examples of computing a qualification score are provided below. Other ways of computing a qualification score are possible even though they may not be described herein. In general, qualification scoring can include any manner of assigning, computing or otherwise obtaining values or components used to generate a score.

In a particular embodiment, competency component values are assigned depending on whether a request for a resource includes a competency requirement and an optional proficiency level. For example, if a resource is required to be competent in a specific computer language, and further required to be "highly" competent in that specific computer language, then any resource that meets both the competency and proficiency is assigned a value of 1 for the competency component. If the competency requirement is met but the proficiency level is not met then the competency component value is assigned 0.5. If the competency requirement is not present at all in the resource then the competency component value is assigned 0. If the proficiency level requirement is not specified in the request then the competency component value is assigned a 1 or a 0 depending upon whether the resource being considered has the competency or does not have the competency, respectively, regardless of any proficiency level associated with the resource's competency.

Each qualification or competency may be associated with a proficiency value, such as expert, advanced, intermediate, or not proficient (e.g., novice). Each proficiency may be associated with a proficiency metric or value. In the present specific embodiment; for the purposes of calculating an overall qualification score, expert, advanced, and intermediate proficiencies may be assigned a value of 0.5, and otherwise 0, as discussed more fully below. The proficiencies module 42 may store proficiency values associated with qualifications of a resource being analyzed.

The keywords module 44 includes computer code for calculating a keyword score for a resource being analyzed for inclusion among search results. To calculate a keyword score, instances of keywords appearing in a resource profile being analyzed are counted and then divided by the highest number of instances of the same keyword found among all other resource profiles being simultaneously analyzed or searched. Hence, the keyword score represents a percentage of the maximum of keywords found among all searched resource profiles. For the purposes of the present discussion, a resource profile may be any computing object, such as a database record, table, file, and so on, associated with or otherwise representing a particular resource.

To calculate an overall qualification score for a particular resource, the qualification scoring module 38 first employs qualification and proficiency information from the competencies module 40 and proficiencies module 42 to determine a competency component, also called a structured qualifications score. The qualification scoring module 38 also retrieves a keyword component, i.e., keyword score, from the keywords module 44. The competency component and the key word component are then averaged by the qualification scoring module 38 to yield the overall qualification score, also called the total qualification score.

For the purposes of the present discussion, a competency component of a score or metric, such as a qualification score, may be any value employed to calculate the score or metric, where the value varies depending upon one or more competency values. A competency value may be any number assigned to a qualification or competency. A proficiency value may be a type of competency value, and may be any metric or characterization whose value varies according to a rating assigned to a quality (e.g., a competency) associated with the resource. Such a metric may, for example, constitute a description, such as high, medium, or low; or the metric may include a specific number within a predetermined range or scale.

Examples of competencies or qualifications include JavaBeans 4.0 programming, French language speaking skills, and so on. Exact choices for competencies are implementation specific and may vary depending upon the implementation. The terms "proficiency value" or "proficiency factor" and "competency score" or "competency score factor" may be employed interchangeably in certain implementations. For example, a resource that is highly proficient, i.e., has a high proficiency, at programming in Java Beans 4.0 may have a high competency score associated with the Java Beans 4.0 competency.

More specifically, the qualification scoring module 38 implements an algorithm that includes two evenly weighted components, also called elements, including a keyword score and a structured qualifications score, i.e., competency score, for qualifications specified in a project resource request. The specified qualifications may be structured qualifications, which are entered or selected by a user, such as a resource manager, via selection from a predefined list of options.

The structured qualifications score component may be determined based on the following:
1. Existence of the qualification; and
2. The proficiency specified for the qualification (if it is specified) in accordance with the following table:

TABLE 1

| Scenario (when qualification and proficiency are specified in the resource request) | Resource Score for that qualification |
|---|---|
| Match on both qualification and proficiency | 100% |
| Match on qualification, not proficiency | 50% |
| No match on qualification | 0% |
| Scenario (when qualification is specified but proficiency is NOT specified in the resource request) | |
| Match on qualification | 100% |
| No match on qualification | 0% |

The structured qualification score component, i.e., competency component, may be calculated by adding each individual resource score determined with reference to Table 1 above, and then dividing the result by the total number of qualifications specified in the request.

Alternatively, for a given resource being analyzed, a value of 0 (or 0%) is assigned to a qualification factor when a resource lacks the associated qualification; a 1 (or 100%) is assigned when the qualification exists; a proficiency factor is assigned a value of 1 (or 100%) when a resource is proficient in the associated qualification or when a proficiency is not requested or specified in a resource request, and a value of 0.5 (or 50%) is assigned to the proficiency factor when a resource is not proficient in the associated qualification. The values for the qualifications (i.e., qualification factors) are then multiplied by their associated proficiency factors. The resulting products are then added to yield an interim result, which is then divided by the sum of all requested qualification values for the resource to yield the structured qualification score for that resource.

In summary, the alternative example algorithm includes assigning a first number (e.g., 1) to each qualification of a resource that matches a qualification specified in the resource request. The algorithm then multiples the first number by a second number (e.g., a proficiency score) that indicates a proficiency value (e.g., 1 or 0.5 for proficient in the qualification or not proficient, respectively) associated with the qualification, yielding a product in response thereto. The example algorithm then averages the products for all requested qualifications to obtain the resulting competency component.

The step of dividing the sum of the products of the qualification factors and proficiency factors by the sum of all requested qualification values represents a type of averaging. Note that other types of averaging, such as weighted averaging, wherein each qualification is assigned a particular weight in accordance with a predetermined priority (e.g., before being multiplied by the proficiency factors) may be employed, without departing from the scope of the present teachings.

In implementations wherein a qualification specified in a resource request is indicated as being required or not required, an additional factor may affect whether a resource is returned among search results. In particular, if a qualification is specified as required, and a resource being analyzed for inclusion among search results does not possess that qualification, the resource will not be indicated in the search results.

The keywords module 44 may return a keyword score for a resource based on: the number of times a keyword specified in a resource request is found in a resource profile being searched, and the highest number of times the same keyword was found in other resource profiles being simultaneously searched. For example if a keyword was found 8 times for a given resource, and that same keyword was found a maximum of 10 times in all other searched resources, then the keyword score for the resource would be 80%. The keywords for a particular resource may be found in sections of the resource profile corresponding to structured qualifications.

After computing the structured qualification score based on inputs from the competencies module 40 and the proficiencies module 42, and after retrieving the keyword score from the keywords module 44, the qualification scoring module determines the overall qualification score by averaging the keyword score and the qualification score, i.e., by adding the structured qualification score to the keyword score and then dividing the result by 2.

The metric computing module 24 may include additional modules and functionality other than that represented by the qualification scoring module 38 and associated competencies module 40, proficiencies module 42, and keywords module 44. For example, the metric computing module 24 may include computer code for determining an availability score based on availability data and time data associated with a retrieved search result. For example, a resource request may indicate that a resource is needed for six weeks starting one month from now. A resource that has more available time during the six week interval may be assigned a higher availability score.

For the purposes of the present discussion, an overall score, also called a total score, may be any number or metric that incorporates, in a calculation of the metric, plural metrics describing or characterizing a person or other resource.

Examples of the plural metrics that may be incorporated into an overall score include a qualification score and a keyword score.

While the overall qualification score computed by the qualification scoring module 38 and associated modules 40-44 is discussed as incorporating a structured qualification score component and a keyword component, note that other components may be incorporated into an overall score without departing from the scope of the present teachings. For example, in certain implementations, an available capacity score may be incorporated as a component of the overall score. An available capacity score may be any metric or number the represents a measurement of a person's or other resource's availability for performing one or more tasks or roles indicated in a resource request. A resource request may include any collection of data or criteria describing one or more characteristics of a resource.

The filtering module 26, sorting module 28, card generator 30, graphic indicator module 32, comparing module 34, and action module 36, include computer code for facilitating filtering search results, sorting search results, displaying search results via cards, presenting graphical indicators in the cards, and performing actions on or pertaining to cards appearing in the search results, respectively.

In particular, the filtering module 26 includes computer code for facilitating implementing filtering functions in response to user input to the user interface software 20. The filtering functions are used to filter search results, i.e., computing objects associated with resources matching a resource request, based on certain filtering criteria. Examples of filtering criteria include competencies of the resource, location, roles, travel preferences, qualification score ranges, availability capacity score ranges, and so on, as discussed more fully below.

The sorting module 28 includes computer code for facilitating sorting results, i.e., computing objects, such as database records, representing one or more resources meeting parameters set forth via a resource request. Results may be sorted, for example, by qualification score, available capacity score, overall score, and so on. Other sorting options, such as an option to sort by resource location proximity to a predetermined location, may be provided without departing from the scope of the present teachings. Furthermore, various sorting options are implementation specific and may be omitted or included in a particular implementation without departing from the scope of the present teachings.

The card generator 30 includes computer code for facilitating arranging data pertaining to retrieved resource results into electronic cards for display via the user interface software 20 and hardware 22.

The graphic indicator module 32 includes computer code for facilitating generating instructions for rendering graphics, such as graphical indicators presented in the cards, for display via the user interface software 20 and hardware 22.

For the purposes of the present discussion, a graphic, also called a visual display element or a graphical display element, may be any icon, visualization, window, dialog box, or other graphical or visual representation of a computing object or metric, where the visual representation may be presented on a display screen, projected, or otherwise displayed. Additional examples of graphics include color coded indicators, pictures, charts (or portions thereof), graphs, visualizations (e.g., sunburst visualizations), and so on.

In the present example embodiment, metrics, such as available capacity scores and qualification scores are illustrated via indicators. An indicator may be any graphic employed to illustrate a value or metric.

The comparing module 34 includes computer code for comparing resource results based on predetermined comparison parameters. Examples of comparison parameters include qualification scores, available capacity scores, and overall scores. For example, resource search results may be compared based on all data present in a given card. Results of the comparison may be displayed via a visualization, ranked list, chart, scatter plot, and so on. Exact methods for displaying results of a comparison operation are implementation specific and may vary depending upon the needs of a given implementation.

The action module 36 includes computer code for facilitating implementing an action pertaining to one or more resource results in response to user input provided via the user interface software 20 and hardware 22. Examples of actions include adding a resource result to a shortlist or other pool of resources; assigning a resource to a particular department or project, contacting a particular resource via email, and so on. The exact types of actions and associated user options provided by the system 10 are implementation specific and may vary accordingly.

The card display controller 46 includes software for interfacing the user interface software 20 with functionality provided by the modules 24-36. The card display controller 46 communicates with and incorporates inputs from the modules 24-36 for facilitating rendering a display of cards (representing search results, i.e., resources) via the user interface software 20 and hardware 22.

While various modules of the system 10 are shown as separate modules, certain modules may be incorporated into other modules or may be separated from other modules, without departing from the scope of the present teachings. For example, the resource search and display module 12 may be integrated with the user interface software 20, and the user interface software 20 may be incorporated as part of the HR database software 16.

In general, the various modules of the system 10, such as modules 22-36 of the resource search and display module 12, may be implemented via one or more computer functions, procedures, routine libraries, and so on, and the functionality may be distributed among resources of a network or consolidated into a single module, without departing from the scope of the present teachings. Similarly, the various modules of the system 10 may be implemented via a single computer or multiple computers distributed over a network, without departing from the scope of the present teachings.

Figure 2:
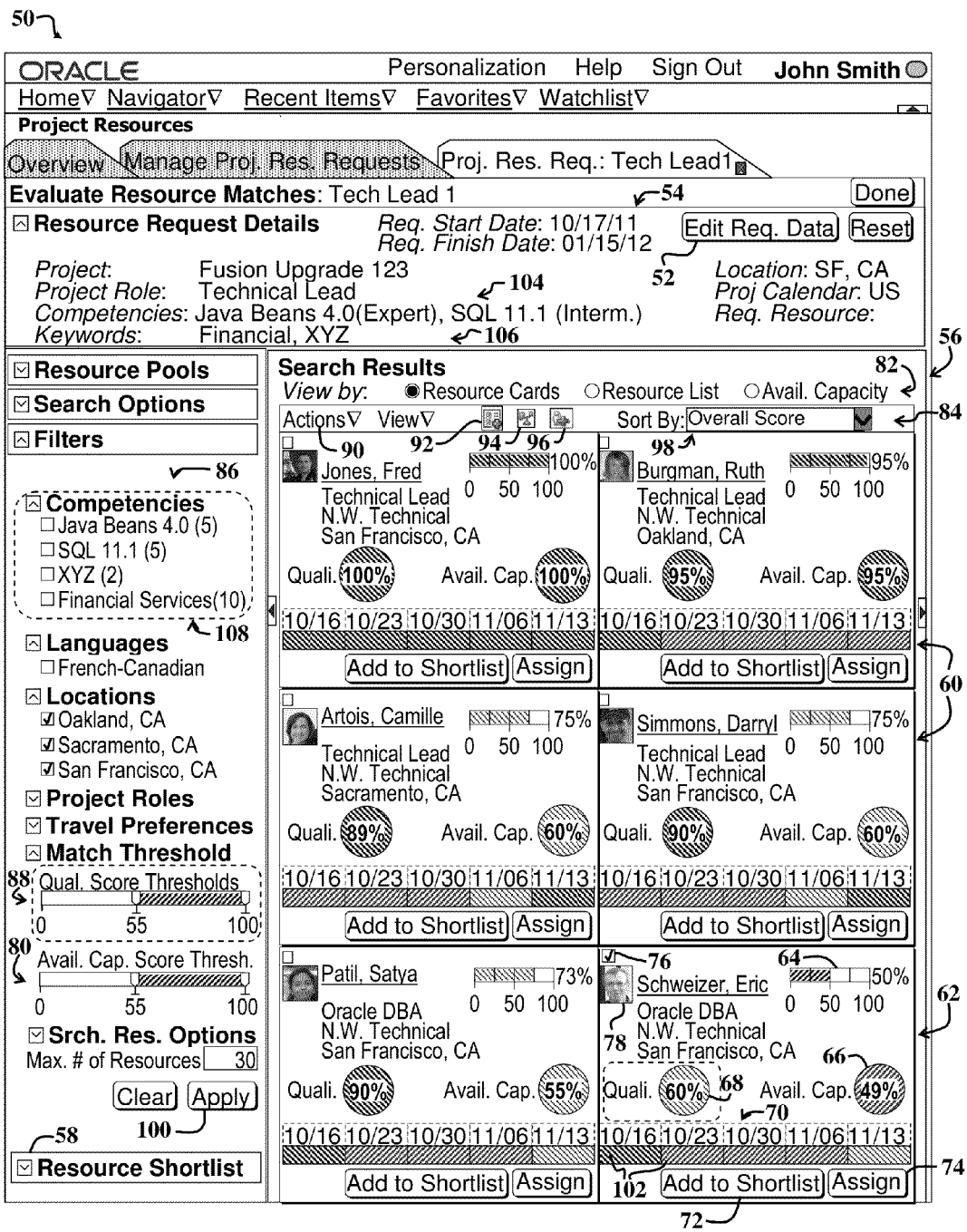
FIG. 2 is a first example user interface display screen adapted for use with the system of FIG. 1 and illustrating example search results and accompanying qualification scores, score components, and score thresholds.

FIG. 2 is a first example user interface display screen 50 adapted for use with the system of FIG. 1 and illustrating example search results (via various cards 60) and accompanying qualification scores (via qualifications graphics 68), score components (e.g., pertaining to requested competencies 86, 104 and keywords 106), and score thresholds 88.

The user interface display screen 50 includes a resource request section 54, which shows various details of an example resource request, such as project name, start date, finish date, location, requested competencies (i.e., qualifications), and so on. The resource request details include example specifications of various requested competencies 104 and keywords 106. When profiles of candidate resources are searched, the specified competencies 104 and keywords 106 are employed, e.g., by the resource search and display module 12 of FIG. 1, to calculate qualification scores. Qualifications scores of resource search results, also called match results, are graphically displayed in cards 60 via qualifications graphics 68. User selection of an edit button 52 may trigger opening of another window or dialog box, wherein a user may adjust the resource request details, also called query parameters, search criteria, or resource request criteria, as discussed more fully below with reference to FIG. 3.

The qualifications graphics 68 are color coded or otherwise visually coded, such as by color coding, shading, outlining, and so on. The qualifications graphics 68 indicate a calculated qualification score for each search result, e.g., as calculated via the qualification scoring module 28 of FIG. 1. An example color scheme for color coding a qualifications score graphic may include red, green, and blue colors to indicate how well a resource matches the requested qualifications 104 and keywords 106 specified in the resource request details 54. For example, a green circle may indicate a resource with a qualification score of 80% or higher; a yellow circle may indicate a resource with a qualification score between 50-79%, and a red circle may indicate a resource with a qualification score between 0-49%.

Requested qualifications found among search results 60 indicated in a search results section 56 may be indicated in a competencies sub-section 108 of a filter section 86 to the left of the search results section 56. The number of found resources that have a particular qualification may be indicated adjacent to qualifications, i.e., competencies, listed in the competencies section 108 (shown in parenthesis). Alternatively, or in addition, numbers adjacent to a listed competency in the competencies sub-section 108 may include a count of instances of keywords found in resource profile descriptions of competencies. In other words, a count of any keyword matches found in qualification profile of a resource may appear along with a count of resources having that qualification. For example, the keyword "Financial" was requested (e.g., as shown in the keywords 106). The match engine (e.g., resource search and display module 12 of FIG. 1) found 10 resource search results with a qualification containing the term "Financial." Accordingly, a count of 10 is indicated adjacent to the "Financial Services" qualification in the competencies sub-section 108.

A qualification score slider 88 provides a user option to customize or filter search results (represented by cards 60) displayed in the results section 56 according to a user specified range of qualification scores, as discussed more fully below.

The search results section 56 includes various user interface controls 82, 84 for manipulating the displayed results, i.e., cards 60. For example, radio buttons 82 provide user options to display search results as cards, in a resource list (e.g., a table), or a listing according to available capacity of a person (human resource) associated with a card. Additional radio buttons may provide additional options, such as for cascading the cards 60 or for arranging the tiled cards 60 into a filmstrip view, without departing from the scope of the present teachings.

A tool bar 84 includes an actions drop down menu 90, a shortlist button 92, a compare button 94, an assign button 96, and a sort drop down list 98. The various user interface controls of the toolbar 84 may be used to manipulate selected cards. The cards 60 may be selected by checking a check box 76 included in each of the cards.

For example, to implement a compare operation comparing different cards, a user (e.g., resource manager) may first select each check box 76 for the cards that the user wishes to compare. The user may then select the compare button 94. Similarly, to add certain cards to a shortlist 58, a user may select cards by checking one or more of the check boxes 76, and then clicking the shortlist button 92.

Each card 60 also includes a picture 78, an overall score graphic 64, a qualifications graphic 68, an available capacity graphic 66, and a five-week availability indicator 70. The graphic indicators 64-70 are color coded or otherwise visually coded. For the purposes of the present discussion, a visually coded graphic or indicator may be any user interface element whose appearance has been adjusted in accordance with a scheme. For example, the color of a graphic may be adjusted to represent different ranges of values. Note that coding other than color coding may be employed. For example, shapes and/or sizes of graphics may be adjusted in accordance with different values or ranges of values associated with a given metric.

The five-week availability indicator 70 represents a graphic illustrating a resource's availability for a five week period. In the present example embodiment, the five week period corresponds to weeks within or near a start date and completion date of a project for which a resource is sought, as indicated in the example resource request details section 54.

The five-week availability indicator 70 includes plural sections 102 that correspond to weeks within a predetermined five week interval. Each section 102 is color coded or otherwise visually coded to convey or indicate an availability score corresponding the section. An available capacity score illustrated via the available capacity indicator 66 may represent a combination of the availability scores for the various sections 102 of the five-week availability indicator 70. Note that time periods other than five weeks, and partitions other than weekly partitions, may be employed in an availability indicator without departing from the scope of the present teachings. The five-week availability indicator 70 enables a resource manager to determine when a resource may become available and to make decisions accordingly.

Additional buttons 72, 74 for adding a card to a shortlist and for assigning a resource associated with a particular card to a project are also included. The search results section 56 may include different, additional, or fewer user interface controls than those shown, without departing from the scope of the present teachings.

The example filtering section 86 provides various user interface controls for filtering which cards 60 are displayed via the display section 56. For example, the displayed cards may be filtered by competencies, languages spoken, location, project role, travel preferences, and so on. Various filtering criteria may be employed by checking a box adjacent to the filtering criteria.

In the present example embodiment, checking a box next to an element of the filters 86 may cause inclusion of only resources characterized by the selected element. Selection of simultaneous filtering elements may cause inclusion of only resources characterized by one or more of the selected elements. Alternatively, only cards of resources that are described by both elements are then shown. Alternatively, selected filtering elements cause exclusion of cards corresponding to resources described by the selected filtering elements. Exact filter behaviors and provided filtering options are implementation specific and may vary between implementations, without departing from the scope of the present teachings.

In the present example embodiment, the filter section 86 further includes the qualification score slider 88 and an available capacity score slider 80. The sliders 88, 80 include movable tabs, also called bars, for enabling a user to specify ranges, also called regions, for a qualification score and an available capacity score. The regions represent ranges within which the qualification score and availability capacity score of a resource must land to be included among filtered search results, i.e., cards 60, displayed in the search results section 56. After a user has checked specific filtering criteria and/or adjusted the slider bars 88, 80, a user may apply the filtering criteria by selecting an apply button 100.

The sliders 88, 80 represent examples of slider user interface controls. For the purposes of the present discussion, a slider user interface control may be any user interface control with a graphic that can be positioned or moved to change values corresponding to positions of the graphic. A slider bar may be any movable graphic of a slider user interface control.

Pictures 76 and/or other components of the cards 60 may be hyperlinked such that selection thereof may cause display of another window or dialog box with additional details of an associated human resource. Functionality for viewing additional details of a resource associated with a card is called drill down functionality herein. Such drill down functionality may be further accessible via a user option provided via the actions drop down menu 90 or other mechanism.

Exact additional details displayed in response to selection of a hyperlinked picture, a hyperlinked name of a card, or a details item in a drop down menu, are implementation specific. Examples of additional details that may be shown include indications of knowledge areas, languages spoken, competencies or knowledge areas, salary, and so on.

Hence, the example user interface display screen 50 may be considered a resource management user interface display screen, wherein search results obtained in response to a resource request are displayed in cards 60, and wherein each card 60 has one or more graphics 64-70.

FIG. 3 is a second example user interface display screen 110 adapted for enabling a user to edit the resource request indicated in the resource request section 54 of FIG. 2. The example user interface display screen 110 may be activated in response to selection of the edit button 52 of the resource request section 54 of the user interface 50 of FIG. 2.

The example user interface display screen 110 includes a project details section 112, which indicates various project details for which a resource is being requested. Example project details include project name, requested start and end dates, location of the project, name of the project, name of the position, whether the resource request has been fulfilled (e.g., whether the status is open or closed), which resource, if any, has been assigned to fulfill the resource request, and so on.

The example user interface display screen 110 further includes a request table 114, wherein a user, such as a resource manager, may enter requested resource characteristics, e.g., qualification and keyword requests or requirements, and so on. Note that in certain implementations, the table 114 may include additional user options for enabling a user to specify whether a requested resource characteristic is required or optional, without departing from the scope of the present teachings.

The request table 114 includes various editable columns 120-124 and a language proficiency section 126. A tool bar 116 provides various user options for editing and performing actions on the various table sections 120-126, including the accompanying fields.

In the present example embodiment, all requested resource characteristics are considered requirements, which are identified in a first requirements column 120. Example requirements include specified qualifications and keywords, such as Java Beans 4.0, SQL 11.1, and so on, which should be specified in resource profiles returned as search results in response to a resource request.

The second request type column 122 is adjacent to the request column 120 and indicates the types of requests. A third proficiency column 124 indicates requested minimum proficiency levels, e.g., expert, intermediate, and so on, associated with each item in the request column 120. Note that various proficiency level descriptions, such as expert, intermediate, and so on, may be assigned numerical values for the purposes of calculating overall qualification scores or other metrics.

The language section includes various columns and fields for indicating required language proficiencies associated with any languages specified in the request column 120. Examples of types of language proficiencies include reading, speaking, and writing language proficiencies.

Figure 4:
FIG. 4 is a third example user interface display screen illustrating example resource details of a particular search result, including indications of associated qualifications and keywords relevant to a particular resource request.

FIG. 4 is a third example user interface display screen 130, called the resource details screen, illustrating example resource details of a particular search result, including indications of associated qualifications and keywords relevant to a particular resource request. The resource details screen 130 may be activated, for example, in response to user selection of a hyperlinked name or image-mapped photograph of one of the cards 60 of the search results of FIG. 2.

The resource details screen 130 includes a resource information section 132, which includes a qualification score indicator 64 and resource identification information 134, such as resource name, job title, and so on.

A qualifications section 164 also includes a visually coded qualification score graphic 136. An additional user option 168 to display calculation details of the qualification score set forth above is also provided.

Note that in the present specific embodiment, the qualification score and overall match score are equivalent. However, in certain implementations, the overall match score and qualification score may be different. For example, in certain implementations, the overall match score may further incorporate availability scores and/or other metrics.

The qualifications section 164 includes various tables 138, 146, 154, including a requested qualifications table 138, a requested keywords table 146, and a keyword details table 154. The requested qualifications table 138 includes a first qualifications column 140, which lists qualifications requested in a resource request. An adjacent proficiency column 142 indicates proficiency ratings for each qualification exhibited by the resource. In the present example embodiment, the resource Ruth Burgman is considered an expert at Java Beans 4.0 and SQL 11.1.

The proficiency column 142 further includes graphical proficiency indicators 144 adjacent to each indicated proficiency value. Each of the graphical indicators 144 represent a degree to which a resource matches a particular qualification listed in the qualifications column 140.

In particular, the graphical indicators 144 are visually coded as follows. When a qualification is requested but no proficiency is specified, the corresponding graphical indicator 144 will include a checkmark in the row associated with the qualification characterizing the resource. When a qualification is requested, and a proficiency is specified, a checkmark will appear for resources that possess that qualification and at least the specified proficiency level; a checkmark with a plus sign will appear for resources that possess the qualification but have a higher proficiency than that requested; and checkmark with a minus sign will appear for resources that possess the qualification but have a lower proficiency than that requested. If a resource lacks the qualification a red circle with a line through it (i.e., a null symbol) appears. Hence, the requested qualifications table 138 presents a detailed listing of requested qualifications and indications of how or to what degree a particular resource matches the requested qualifications.

The requested keywords table 146 includes a keywords column 148, which represents a listing of keywords specified in a resource request that has indicated Ruth Burgman as a resource search result. An adjacent keyword matches column 150 indicates a number of matching keywords found in a profile of the resource, i.e., in Ruth Burgman's profile. Ruth Burgman's profile may be a computing object, such as a record, maintained via the HR database 16 of FIG. 1.

Additional details as to where in Ruth Burgman's profile keyword matches were found are provided in the keyword details table 154. The keyword details table 154 includes a first keywords column 156, an adjacent matching qualifications column 158, a proficiency column 160, and a content type column 162. The matching qualifications column 158 indicates qualifications, which may correspond to sections of or listings in a resource profile wherein the specified keywords were found. The adjacent proficiency column 160 indicates one or more proficiencies associated with the qualification section or qualification name that included the requested keyword(s). The content type column 162 indicates a categorization of each qualification associated with each requested keyword. Exact names for particular qualifications, proficiency levels, and qualification categorizations are implementation specific and may vary without departing from the scope of the present teachings.

A show less/more user interface control 152 represents a user option to show or hide the keyword details section 154, thereby enabling a user to selectively drill into, i.e., display, further details pertaining to the exact qualifications in a resource profile which are associated with existence of requested keywords.

Hence, the resource details screen 130 facilitates conveying information indicating how a particular resource search result (that was returned among search results in response to a resource request) matches qualifications and/or keywords specified in the resource request. In particular, various details of the resource details screen 130 enable users to efficiently determine which qualifications characterizing a resource search result are relevant to the associated resource request.

For example, readily understandable visual indicators, such as qualification score graphics 64, 136 and proficiency indicators 144 illustrate why a particular resource result was returned and provide insight for enabling users, such as resource managers, to make informed resource selection decisions. Hence, the resource details screen 130 provides various details illustrating components behind search results and associated qualifications scores, thereby enabling users to readily understand how a particular resource search result matches resource request criteria.

FIG. 5 is a third example user interface display screen 170 (called the comparison screen) illustrating results of an example compare operation and providing a juxtaposition of qualifications and keywords associated with plural resource search results, which are relevant to a particular resource request.

A resource information section 172 illustrates information, such as job title, project role, location, and qualifications scores for resources being compared. Details for each resource being compared are provided in separate adjacent columns. Each row of a column contains information pertaining to the resource indicated in the column. For example, an overall match score row includes visually coded graphical indicators 64 for each resource being compared. The visually coded graphical indicators represent qualification scores or overall match scores, which may be equivalent depending upon the implementation.

A requested qualifications section 174 juxtaposes, in adjacent columns, proficiency ratings for various requested qualifications for each resource result being compared. The proficiency ratings are accompanied by graphical proficiency indicators 144, which are coded similarly to the indicators 144 of FIG. 4.

A requested keywords section 176 includes columns juxtaposing instances of keyword matches for each compared resource search result. Numbers of keyword matches for each keyword for each resource areas shown via keyword indicators 178, which are visually coded based on the number of keywords appearing in each resource profile corresponding to each resource search result.

FIG. 6 is a fourth example user interface display screen 180, which is accessible via the third example user interface display screen of FIG. 5. The fourth example user interface display screen 180, called a keyword details screen, illustrates additional details pertaining to key words found resource results profiles being compared. The keyword details screen 180 may appear within the third example user interface display screen 170 of FIG. 5 upon selection of the show more/less user interface control 152 thereof.

The keyword details section 180 includes various columns 184-188 illustrating details for each keyword found in each profile of the compared resource search results. In the present example embodiment, the portions or sections of each profile wherein keywords are found correspond to listed matching qualifications 184 and are named accordingly.

Hence, the comparison screen 170 of FIG. 5 in combination with the keyword details screen 180 of FIG. 6, include various information and features enabling a user to view side-by-side comparisons of qualifications of selected resource search results; side-by-side comparisons of keyword matches; and details pertaining to qualifications in the resources profiles that contain the keywords. Hence, users may readily compare resource search results and determine which resources have qualifications containing the requested keywords, and so on.

Figure 7:
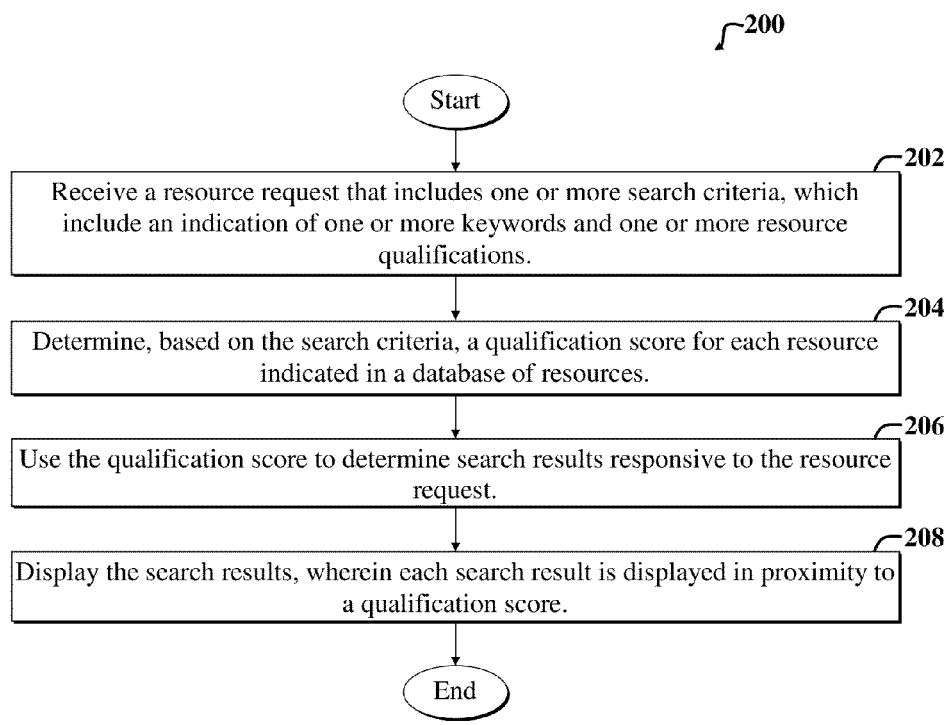
FIG. 7 is a flow diagram of a first example method adapted for use with the embodiments of FIGS. 1-6.

FIG. 7 is a flow diagram of a first example method 200 adapted for use with the embodiments of FIGS. 1-6. The example method 200 includes a first step 202, which involves receiving a resource request, such as via the user interface hardware 22 and software 20 of FIG. 1. The resource request includes one or more search criteria, such as requested resource qualifications, keywords, and so on.

A second step 204 includes determining, based on the search criteria, a qualification score for each resource indicated in a database of resources.

A third step 206 includes using the qualification score to determine search results responsive to the resource request.

A fourth step 208 includes displaying the search results. Each search result, e.g., as illustrated via a card 60 of FIG. 2, is displayed in proximity to a qualification score, such as a qualification score indicated via a qualification score graphic 68 of FIG. 2.

Figure 8:
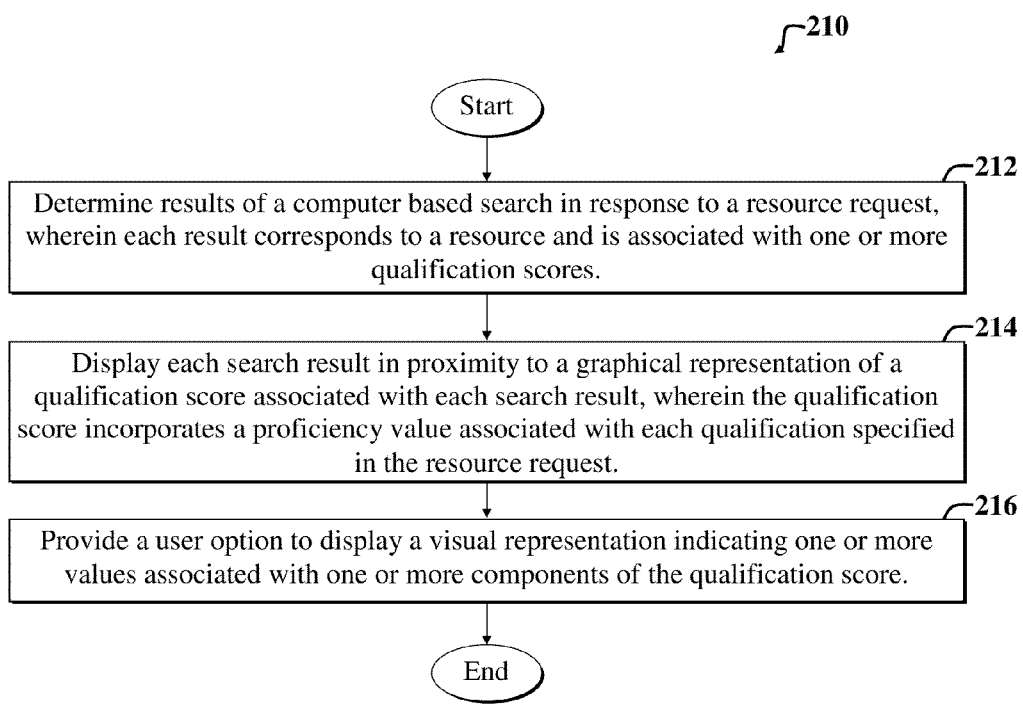
FIG. 8 is a flow diagram of a second example method adapted for use with the embodiments of FIGS. 1-6.

FIG. 8 is a flow diagram of a second example method 210, which is adapted for use with the embodiments of FIGS. 1-6. The second example method 210 includes an initial determining step 212, which includes determining computer based search results in response to a resource request. Each search result corresponds to a resource, and is associated with a one or more qualification scores.

A subsequent displaying step 214 includes displaying each search result in proximity to a graphical representation of a qualification score associated with each search result. The qualification score incorporates a proficiency value associated with each qualification specified in the resource request.

Next, a providing step 216 provides a user option to display a visual representation indicating one or more values associated with one or more components of the qualification score.

Various steps of the method 210 may be altered or augmented without departing from the scope of the present teachings. For example, qualification score displayed in the displaying step 214 may incorporate an average of a keyword component and a competency component, wherein the competency component includes a qualification sub-component and a proficiency sub-component.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a computer system in an enterprise computing environment, for displaying a search result and a qualification score for the search result, the method comprising:

receiving, by the computer system, a resource request, wherein the resource request includes one or more search criteria used to search a database of resources accessible by the computing system, wherein the one or more search criteria include an indication of one or more keywords and one or more resource qualifications, wherein each resource qualification is associated with a proficiency level indicating proficiency of a resource in performing an associated resource qualification;

determining, based on a particular keyword in the search criteria, a keyword score of a first resource, included in the database, with the keyword score proportional to the number of times the particular keyword appears in a resource profile of the first resource;

determining, based on a particular resource qualification and a proficiency level associated with the particular resource qualification, a competency score for the first resource;

determining, based on the search criteria, the keyword score and the competency score, a qualification score for the first resource, wherein the qualification score is calculated by combining components of the qualification score according to an algorithm and wherein the components of the qualification score include the competency score and the keyword score; and displaying information about the first resource in a card, with the card including a user interface responsive to user input to obtain additional information about the first resource and with the card displaying a graphic indicia of the qualification score.

2. The method of claim 1 further comprising:

assigning a first number to each qualification of the first resource that matches a qualification specified in the resource request;

multiplying the first number by a second number that indicates a proficiency value associated with the qualification, yielding a product in response thereto; and averaging products for all qualifications of the first resource that match qualifications specified in the resource request.

3. The method of claim 2 further comprising:

not displaying resource search results that do not contain resource qualifications that are indicated in the resource request as being required.

4. The method of claim 1 with the algorithm further comprising:

determining a number of instances of a keyword appearing in a resource profile; and dividing the number of instances by a highest number of instances of the keyword found in resource profiles concurrently being searched.

5. The method of claim 1 with the algorithm further comprising:

averaging the competency component and the keyword component to yield the qualification score.

6. The method of claim 1 further comprising:

determining one or more keyword scores for each resource being searched.

7. The method of claim 1 with the user interface responsive to user input to display details pertaining to keyword matches.

8. The method of claim 7 wherein the details include one or more indications of a number of instances of a keyword occurring in a profile of the first resource and a location in the profile in which the keyword appears.

9. The method of claim 1 wherein the displaying further includes displaying a graphical representation indicative of a degree to which a resource matches a resource request.

10. The method of claim 9 wherein the graphical representation includes a first representation when the first resource has a particular requested qualification and a requested proficiency value specified in the resource request; a second representation when the first resource has a particular requested qualification but having a higher proficiency score than that requested in the resource request; a third representation when the first resource has a particular requested qualification but a lower proficiency score than that requested in the resource request; and a fourth representation when the first resource lacks a particular requested qualification that was requested in the resource request.

11. The method of claim 1 further comprising:
displaying, in response to user input to the user interface, calculation details of a qualification score for a particular resource.

12. The method of claim 1 wherein the displaying further comprises:
displaying the search results via one or more cards, wherein each of the one or more cards includes information pertaining to a particular search result.

13. The method of claim 12 wherein displaying further comprises:
illustrating, in a card, at least a portion of the information via one or more graphics, wherein the portion of the information includes one or more qualification scores.

14. The method of claim 13 wherein the one or more graphics include one or more visually coded graphics.

15. The method of claim 14 further comprising:
selecting, in response to user input to the user interface, a visually coded graphic of a qualification score to display details of a qualification score, wherein the details include one or more factors pertaining to instances of one or more key words occurring in a computing object associated with a resource.

16. The method of claim 1 further comprising:
comparing, in response to user input to the user interface, resources appearing in the search results and
displaying one or more graphics for each resource being compared, wherein the one or more graphics indicate values associated with one or more search criteria specified in the resource request.

17. An apparatus comprising:
a digital processor coupled to a display and to a processor-readable storage device, wherein the processor-readable storage device includes one or more instructions executable by the digital processor to perform the following acts:
receiving a resource request, wherein the resource request includes one or more search criteria used to search a database of resources accessible by the computing system, wherein the one or more search criteria include an indication of one or more keywords and one or more resource qualifications, wherein each resource qualification is associated with a proficiency level indicating proficiency of a resource in performing an associated resource qualification;
determining, based on a particular keyword in the search criteria, a keyword score of a first resource, included in the database, with the keyword score proportional to the number of times the particular keyword appears in a resource profile of the first resource;
determining, based on a particular resource qualification and a proficiency level associated with the particular resource qualification, a competency score for the first resource;
determining, based on the search criteria, the keyword score and the competency score, a qualification score for the first resource, wherein the qualification score is calculated by combining components of the qualification score according to an algorithm and wherein the components of the qualification score include the competency score and the keyword score; and
displaying information about the first resource in a card, with the card including a user interface responsive to user input to obtain additional information about the first resource and with the card displaying a graphic indicia of the qualification score.

18. A non-transitory processor-readable storage device including instructions executable by a digital processor, the non-transitory processor-readable storage device including one or more instructions for:
receiving a resource request, wherein the resource request includes one or more search criteria used to search a database of resources accessible by the computing system, wherein the one or more search criteria include an indication of one or more keywords and one or more resource qualifications, wherein each resource qualification is associated with a proficiency level indicating proficiency of a resource in performing an associated resource qualification;
determining, based on a particular keyword in the search criteria, a keyword score of a first resource, included in the database, with the keyword score proportional to the number of times the particular keyword appears in a resource profile of the first resource;
determining, based on a particular resource qualification and a proficiency level associated with the particular resource qualification, a competency score for the first resource;
determining, based on the search criteria, the keyword score and the competency score, a qualification score for the first resource, wherein the qualification score is calculated by combining components of the qualification score according to an algorithm and wherein the components of the qualification score include the competency score and the keyword score; and
displaying information about the first resource in a card, with the card including a user interface responsive to user input to obtain additional information about the first resource and with the card displaying a graphic indicia of the qualification score.

* * * * *